United States Patent
Grüner et al.

(10) Patent No.: US 7,353,794 B2
(45) Date of Patent: Apr. 8, 2008

(54) FILTER-COOLER COMBINATION FOR LIQUIDS, ESPECIALLY FOR THE LUBRICATING OIL OF A MOTOR VEHICLE INTERNAL COMBUSTION ENGINE

(75) Inventors: Andreas Grüner, Hattenhofen (DE); Robert Sendor, Wolfratshausen (DE)

(73) Assignee: MAHLE International GmbH, Stuttgart, DE (US)

( * ) Notice: Subject to any disclaimer, the term of this patent is extended or adjusted under 35 U.S.C. 154(b) by 0 days.

(21) Appl. No.: 11/629,140

(22) PCT Filed: Mar. 16, 2006

(86) PCT No.: PCT/DE2006/000465
§ 371 (c)(1),
(2), (4) Date: Dec. 8, 2006

(87) PCT Pub. No.: WO2006/097086
PCT Pub. Date: Sep. 21, 2006

(65) Prior Publication Data
US 2007/0175434 A1    Aug. 2, 2007

(30) Foreign Application Priority Data
Mar. 18, 2005    (DE) .................... 10 2005 012 550

(51) Int. Cl.
*F01M 11/03* (2006.01)
(52) U.S. Cl. ............................. 123/196 AB; 123/196 A
(58) Field of Classification Search ......... 123/196 AB, 123/196 A, 41.33; 184/104.3, 104.2; 210/184, 210/186; 165/119, 167
See application file for complete search history.

(56) References Cited

U.S. PATENT DOCUMENTS

| 4,193,442 A | 3/1980 | Vian |
| 4,426,965 A * | 1/1984 | Patel .................... 123/196 AB |
| 4,561,494 A | 12/1985 | Frost |

(Continued)

FOREIGN PATENT DOCUMENTS

DE    30 00 787    10/1980

(Continued)

OTHER PUBLICATIONS

International Search Report.

*Primary Examiner*—Stephen K. Cronin
*Assistant Examiner*—Hyder Ali
(74) *Attorney, Agent, or Firm*—Collard & Roe, P.C.

(57) ABSTRACT

The invention relates to a filter-cooler combination for liquids. The filter is a screw-type cartridge that comprises inlet and outlet openings on a front face and that can be detachably screwed to a connecting element having first connecting channels that are associated with the inlet and outlet openings by means of a central thread, while being radially sealed on the front face; the connecting element comprises the cooler and is provided with second connecting channels for the inlet and outlet channels of the coolant leading towards and away, from the filter-cooler combination, and with third connecting channels for the inlet and outlet channels of the liquid to be filtered leading towards and away, from the filter-cooler combination; the connecting element can be detachably connected to a base carrying the connecting element while the third connecting channels are associated with connecting channels of the base.

8 Claims, 1 Drawing Sheet

U.S. PATENT DOCUMENTS

Figure 1:
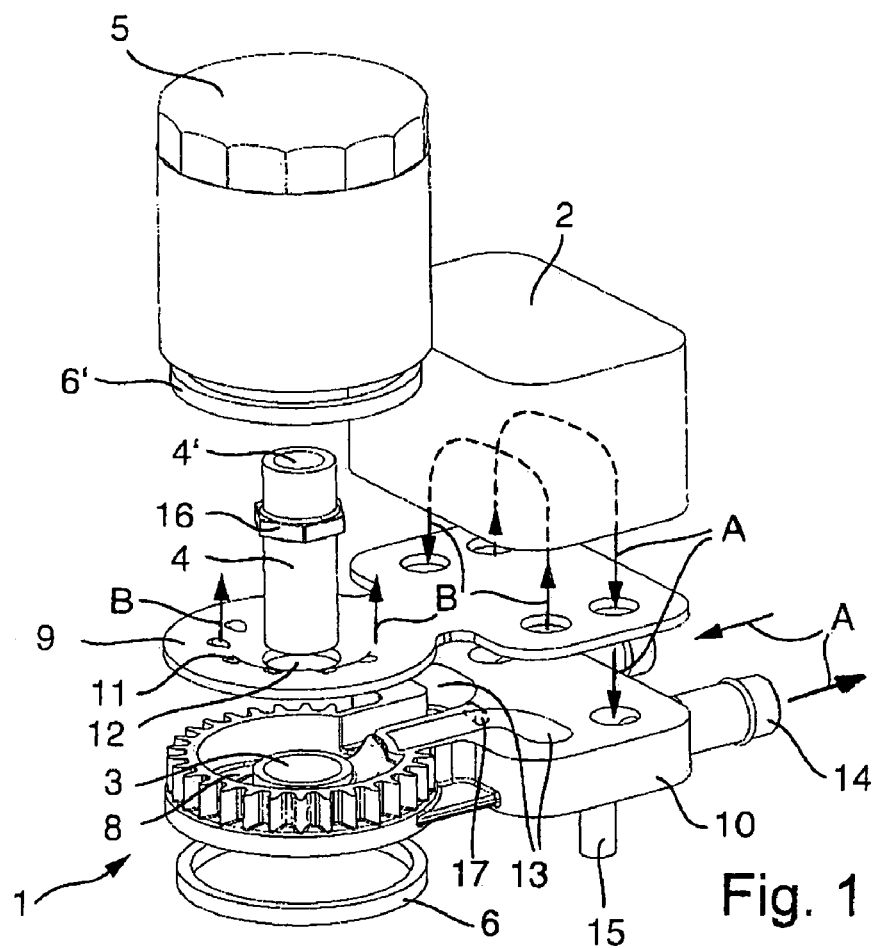

| | | |
|---|---|---|
| 5,014,775 A | 5/1991 | Watanabe et al. |
| 5,351,664 A | 10/1994 | Rotter et al. |
| 5,544,699 A | 8/1996 | Robers et al. |
| 5,797,450 A | 8/1998 | Kawabe et al. |
| 6,016,784 A | 1/2000 | Tanaka |
| 6,263,962 B1 * | 7/2001 | Komoda et al. ............ 165/167 |
| 6,558,536 B2 * | 5/2003 | Jainek et al. ............... 210/184 |
| 6,994,784 B2 * | 2/2006 | Jainek ........................ 210/149 |
| 7,007,749 B2 * | 3/2006 | Brost et al. ................. 165/167 |

FOREIGN PATENT DOCUMENTS

| | | |
|---|---|---|
| DE | 198 03 231 A1 | 8/1998 |
| EP | 0 421 570 A1 | 4/1991 |
| EP | 0 563 951 B1 | 10/1993 |
| EP | 0 600 574 B1 | 6/1994 |

* cited by examiner

FILTER-COOLER COMBINATION FOR LIQUIDS, ESPECIALLY FOR THE LUBRICATING OIL OF A MOTOR VEHICLE INTERNAL COMBUSTION ENGINE

CROSS REFERENCE TO RELATED APPLICATIONS

Applicants claim priority under 35 U.S.C. §119 of German Application No. 10 2005 012 550.6 filed Mar. 18, 2005. Applicants also claim priority under 35 U.S.C. §365 of PCT/DE2006/000465 filed Mar. 16, 2006. The international application under PCT article 21(2) was not published in English.

The invention relates to a filter-cooler combination for liquids, in particular the lubricating oil of an automotive internal combustion engine according to the preamble of Patent claim 1.

Such a filter-cooler combination is known in various embodiments from U.S. Pat. No. 5,797,450, US-A-5,014,775 and US-A-5,544,699, for example. These known devices allow replacement of a conventional screw-on cartridge with such a filter-cooler combination in an oil filter of an internal combustion engine, for example, preferably without requiring any change in the base part onto which the filter cartridge is to be screwed. In the latter case, the filter in the filter-cooler combination is preferably designed in the form of a conventional screw-on filter element which can be screwed directly onto the base part, either within the combination or outside of such a combination if a filtercooler combination is not desired.

U.S. Pat. No. 5,351,664 describes a filter-cooler combination in which an air cooler is part of the generic connecting element. With this air cooler, the cool air is not carried in a closed flow channel. Instead the flow passes freely around the cooler on the outside.

The invention relates to the problem of simplifying the design of a generic filter-cooler combination to thereby permit an especially inexpensive and economical production.

This problem is solved by a design of a generic filter-cooler combination according to the characterizing features of Patent claim 1.

Advantageous and expedient embodiments are the subject matter of the subclaims.

A method according to the last subordinate claim is especially advantageous with respect to inexpensive manu-facturability of the filter-cooler combination.

The invention is based on the general idea of creating a filter-cooler combination with which a connecting element having a simple design with a cooler integrated into it so that is to be attached to the base part in the same way as a screw-on cartridge instead of a conventional screw-on filter cartridge. In addition, this connecting element is designed with a connecting geometry for a conventional screw-on filter cartridge which allows such a screw-on cartridge to be screwed onto the intermediate element in the same way as a screw-on cartridge is usually attached to a base part.

The required flow distribution channels for the fluid to be filtered and the cooling fluid are arranged inside the connecting element in a skillful manner in terms of the manufacturing technology. Economical and therefore inexpensive production is achieved by the fact that the connecting element consists of two parts joined together, namely a top part and a bottom part, so that one part of the flow channels is bordered directly in each case.

A connecting element can be manufactured jointly with a cooler in an especially advantageous manner in the sense of the present invention if the cooler is designed in the manner of a stacked-disk oil cooler and if all the elements that are to be joined together are made of metal. Then all the parts that are to be joined together and thus also the individual parts of the stacked-disk oil cooler are joined together fixedly in a single soldering operation in the simplest possible way.

To be able to attach the connecting element like a screw-on cartridge to a base part, this connecting element has a connecting area which practically corresponds to that with which a screw-on cartridge is attached to a base part. A through-passage is provided at the center of this connecting area of the connecting element. A threaded connection with threads cut on both sides can be inserted through this through-passage in which case the connecting element can be connected fixedly to the base part by means of this threaded connection in a manner such as that by which a screw-on cartridge is usually attached to the base part. The threaded end of the threaded connection which is needed not only for the fastening of the connecting element to the base part and protrudes outside of a connecting surface of the connecting element for connection of a conventional screw-on filter cartridge, the screw-on filter can be accommodated in the usual manner. In other words, this means that the screw-on filter cartridge can be screwed onto the connecting element on the threaded connection in a manner identical to or at least similar to the type of connection to the base part.

An advantageous exemplary embodiment is illustrated in the drawing and explained in greater detail below.

Figure 2:
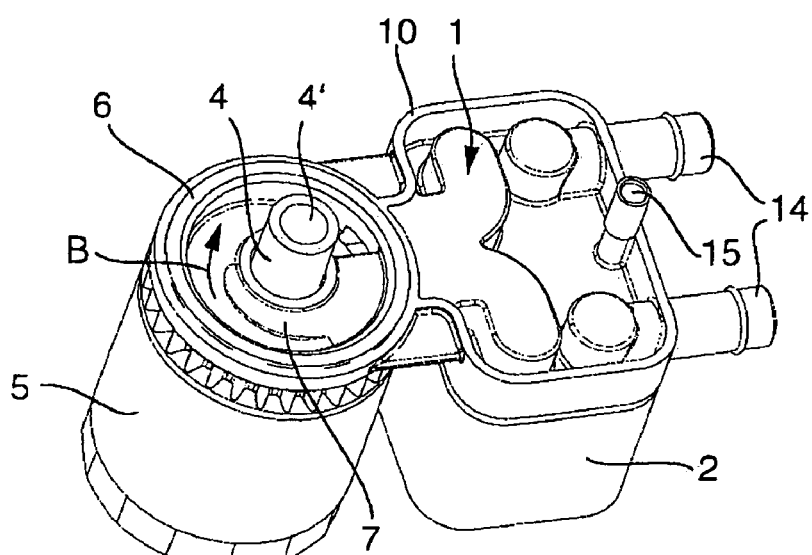

The drawing shows:

FIG. 1 a filter-cooler combination in a perspective exploded diagram,

FIG. 2 a perspective diagram of the filter-cooler combination as seen from below.

A filter-cooler combination comprises an oil cooler 2 fixedly connected to a connecting element 1 in a design made of metal, for example in a stacked-disk embodiment in an essentially known manner.

With the help of a threaded connection 4 that can be inserted into a through-passage 3 in the connecting element 1, the connecting element 1 can be screwed tightly onto a base part (not shown), which may be the crankcase of an automotive internal combustion engine. For this purpose, only a connecting area may be provided on the base part, such as that which must be designed in the usual way to accommodate and attach a conventional screw-on filter cartridge 5. To be able to tighten the connecting element 1 with the threaded connection 4 onto a base part, the threaded connection 4 has a ring collar 16 between its ends serving as an abutment for support on the connecting element 1. The receiving thread required for connection of a conventional screw-on filter cartridge 5 is provided on the end of the threaded connection 4, which is opposite the end by which the cartridge is attached to the base part.

The connecting area with which the connecting element 1 is tightened onto the base part is practically designed in the same manner as the corresponding connecting area of a conventional screw-on filter cartridge 5. This means that a ring gasket 6 which forms an axial seal is provided in this connecting area of the connecting element 1. In concrete terms, this ring gasket 6 is supported in a ring groove of the connecting element 1 suitable for receiving it. The ring gasket 6 surrounds a first annular channel 7, which is designed to be open at the end in the connecting element 1, so that it assumes a closed form when the connecting element 1 is in contact with the base part and it is sealed toward the outside by the ring gasket 6. A second annular channel 8 is axially adjacent to the first annular channel 7 with an axial separation. The two annular channels 7 and 8 surround the threaded connection 4 inserted into the connecting element 1. The second annular channel 8 is closed on the circumference by the fact that it is situated between an upper part 9 and a lower part 10, which together form the connecting element 1, and are joined together with a tight seal.

From the first annular channel 7, fluid to be filtered passes through the cooler 2 into the second annular channel 8 from which the fluid can go through openings 11 within the top part 9 and through a third annular channel 12 into a screw-on filter cartridge 5, e.g., on the unfiltered end. Flow channels 13 leading from the annular channels 7 and 8 into the oil cooler 2 are shaped into the connecting element 1. The shaping there is performed in the same way as in the second flow channel 8, at least with regard to the largest areas of these flow channels 13, so these flow channel areas come to lie between the top part 9 and the bottom part 10 of the connecting element 1. Filtered fluid can flow out of the screw-on filter cartridge 5 through the hollow interior 4' of the threaded connection 4 to the base part.

Instead of individual passages 11 that are separate from one another, there may also be a ring area running in an open form around the threaded connection 4 so that the annular channels 8 and 12 practically form a common annular channel that is continuous axially. With regard to this annular channel, it is necessary only to ensure that there is a tight separation with respect to the interior 4' of the threaded connection 4. The ring collar 4' provided on the threaded connection 4 ensures this by means of tight contact with the through-bore 3.

The screw-on filter cartridge 5 is sealed by a ring gasket 6' with respect to the connecting element 1; this ring gasket corresponds to the ring gasket 6 by means of which the connecting element 1 is sealed on the base part. For addition and removal of the cooling fluid to be passed through the cooler 2, connecting channels 14 are provided on the connecting element 1.

The flow of fluid to be filtered on the one hand and the cooling fluid on the other hand are marked by flow arrows in the drawing. The flow arrows A within the oil cooler mark the flow of the cooling fluid and the flow arrows B mark the flow of the fluid to be filtered. The designations A, B of the flows are also assigned to the other flow arrows accordingly.

Bypass valves may be provided between the flow channels 13 inside the connecting element 1 for a bypass of the cooler 2 through cold lubricating oil, for example. Such a bypass valve 17 is indicated with dash-dot lines in FIG. 1. To be screwed onto a base part in a tight manner, a fixation element 15 in the form of a fixation pin is provided on the connecting element 1. This fixation pin 15 may be inserted into a respective opening in the base part, so the connecting element 1 is secured from twisting when screwed on with the help of the threaded connection 4.

In the use of a cooler 2 in the manner of a stacked-disk cooler made of metal and having a known design, a connection of the individual parts to one another may be created in a shared soldering operation when the top part 9 and the bottom part 10 of the connecting element 1 are also made of metal. In such a way an inventive filter-cooler combination can be manufactured extremely economically.

The inventive filter-cooler combination is designed so that either the connecting element 1 or a screw-on filter cartridge 5 can be mounted directly on a base part with the same connecting ratios. In this way, an automotive internal combustion engine, for example, may be operated optionally with either just a filter in the form of a screw-on cartridge 5 or with a combination of a filter and a cooler without having to create different connecting elements on the crankcase of the internal combustion engine for the two applications for this selection option.

All the features depicted in the description and in the following claims may be essential to the invention either individually or combined in any form.

The invention claimed is:

1. A filter-cooler combination for liquids, in particular lubricating oil of an automotive internal combustion engine, comprising the features the filter is designed as a screw-on cartridge (5) that contains inlet and outlet openings on an end face and can be detachably screwed onto a connecting element (1) having first connecting channels that are assigned to the inlet and outlet openings by means of a central thread and are directed at this end face, the connecting element (1) comprises the cooler (2) and has second connecting channels (14) for the inlet and outlet channels for the coolant, directed away from and outside of the filter-cooler combination and the fluid to be filtered has third connecting channels (7; 3, 4'), the connecting element (1) is detachably connectable to the base part with the assignment of the third connecting channels (7; 3, 4') with respect to connecting channels of said base part carrying the connecting element (1), the connecting element (1) is detachably connectable to the base part by a tubular threaded connection (4), which is open on both ends and can be inserted into the connecting element (1), whereby said threaded connection (4) has at one end a first thread for screwing the screw-on filter cartridge (5) onto the base part, and at the other end a second thread for screwing on a connecting channel of the base part of the third connecting channels, permitting a total of two flows, one inlet and one outlet, one connecting channel is formed by the interior space (4') of the threaded connection and the other is formed by a first annular channel (7) which is situated in an area of a connecting area of the connecting element (1) directly adjacent to the threaded connection (4) with which the connecting element (1) is put under tension on the base part by the threaded connection (4), whereby the two connecting channels (7, 4') are surrounded by a peripheral sealing element (6) by means of which the two connecting channels (7, 4') in the form of a ring gasket with a connecting element (1) stretched onto the base part are sealed toward the outside, comprising the features the first annular channel (7) communicates with the cooler (2) within the connecting element (1), the cooler (2) is designed in the manner of a known stacked-disk oil cooler, the stacked-disk area of the cooler (2) is situated next to the screw-on filter cartridge (5) in a plane perpendicular to the central axis of the screw-on filter cartridge (5) when the cooler (2) is connected to the connecting element (1), within the connecting element (1), a second annular channel (8) communicates with the oil outflow area of the cooler (2) through which fluid to be filtered flows and surrounds axially separated from the first ring channel (7).

2. The filter-cooler combination according to claim 1, wherein the connecting element (1) is provided with a fixing element (15) that can be mounted on the base part in a twist-proof manner.

3. The filter-cooler combination according to claim 1, wherein the connecting element (1) consists of two parts that are fixedly and tightly joined together, namely a top part (9) facing the screw-on filter cartridge (5) that is to be screwed onto the connecting element, and a bottom part (10) facing the base part to which it can be connected, whereby flow channels (8, 13) that are present in the connecting element (1) and join the cooler (2) and the screw-on filter cartridge (5) together, among other things, run at least partially between these two parts (9, 10) and are bordered by them.

4. The filter-cooler combination according to claim 3, wherein the cooler (2) is situated in a housing that can be connected to the top part (9) of the connecting element (1).

5. The filter-cooler combination according to claim 3, wherein the elements comprised by the connecting element (1), namely the cooler (2) with its housing and the top part (9) and the bottom part (10) are welded, soldered or glued together, forming and/or maintaining tight flow channels.

6. The filter-cooler combination according to claim 1, wherein the cooler (2) is designed as a cooler that is made of metal and can be manufactured by a solder joining method which is essentially known for such filters.

7. The filter-cooler combination according to claim 1, wherein at least one bypass valve (17) is provided between the flow channels (13) within the connecting element (1) on the oil flow side upstream from the oil cooler (2).

8. The method for manufacturing a filter-cooler combination having an oil cooler according to claim 6 in particular, wherein the parts forming the connecting element (1) and the cooler (2) are joined together in a shared soldering operation to form a compact module.

* * * * *